United States Patent
Adler et al.

(10) Patent No.: US 11,576,049 B2
(45) Date of Patent: Feb. 7, 2023

(54) SYSTEM AND METHOD FOR OPERATING A RADIO FREQUENCY SYSTEM

(71) Applicant: Continental Automotive Systems, Inc., Auburn Hills, MI (US)

(72) Inventors: Aaron James Adler, Rochester Hills, MI (US); Djordje Preradovic, Shelby Township, MI (US); Akshay Choudhari, Troy, MI (US); Sudhir Khed, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 120 days.

(21) Appl. No.: 17/130,684

(22) Filed: Dec. 22, 2020

(65) Prior Publication Data
US 2021/0195427 A1 Jun. 24, 2021

Related U.S. Application Data

(60) Provisional application No. 62/952,693, filed on Dec. 23, 2019.

(51) Int. Cl.
*H04W 4/00* (2018.01)
*H04W 16/02* (2009.01)
*H04W 72/04* (2009.01)

(52) U.S. Cl.
CPC .......... *H04W 16/02* (2013.01); *H04W 72/04* (2013.01)

(58) Field of Classification Search
CPC ...... H04J 2203/0069; H04Q 2213/394; H04W 72/04; H04W 76/00; H04B 7/2121
See application file for complete search history.

(56) References Cited

U.S. PATENT DOCUMENTS

| | | | |
|---|---|---|---|
| 5,828,948 A | 10/1998 | Almgren et al. | |
| 7,200,767 B2 | 4/2007 | Jonnalagadda | |
| 9,425,883 B2* | 8/2016 | Haran | H04B 7/06 |
| 2009/0279649 A1* | 11/2009 | Tsao | H04L 7/10 |
| | | | 375/354 |
| 2012/0195313 A1 | 8/2012 | White et al. | |
| 2013/0223351 A1 | 8/2013 | Flammer, III | |
| 2015/0023298 A1 | 1/2015 | Winters et al. | |
| 2015/0103680 A1* | 4/2015 | Anand | H04W 72/1242 |
| | | | 370/336 |
| 2015/0147990 A1* | 5/2015 | Kreitzer | H04W 68/12 |
| | | | 455/132 |
| 2018/0124789 A1* | 5/2018 | Yerramalli | H04W 4/70 |
| 2018/0131476 A1 | 5/2018 | Van Driest et al. | |
| 2019/0086518 A1* | 3/2019 | Hallstig | G01S 7/4863 |

* cited by examiner

Primary Examiner — Shantell L Heiber

(57) ABSTRACT

A method of operating a communicator includes operating a first receiver of a plurality of receivers on a first channel of a series of channels. A second receiver of the plurality of receivers is operated on a second channel of the series of channels. A third receiver of the plurality of receivers is operated on a third channel of the series of channels. The second receiver that operates on the second channel includes a reception overlap period of about 25% to about 75% with the first receiver that operates on the first channel and a reception overlap period of about 25% to about 75% with the third receiver that operates on the third channel.

18 Claims, 2 Drawing Sheets

SYSTEM AND METHOD FOR OPERATING A RADIO FREQUENCY SYSTEM

CROSS-REFERENCE TO RELATED APPLICATIONS

This application claims priority to U.S. Provisional Application No. 62/952,693, which was filed on Dec. 23, 2019 and is incorporated herein by reference.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
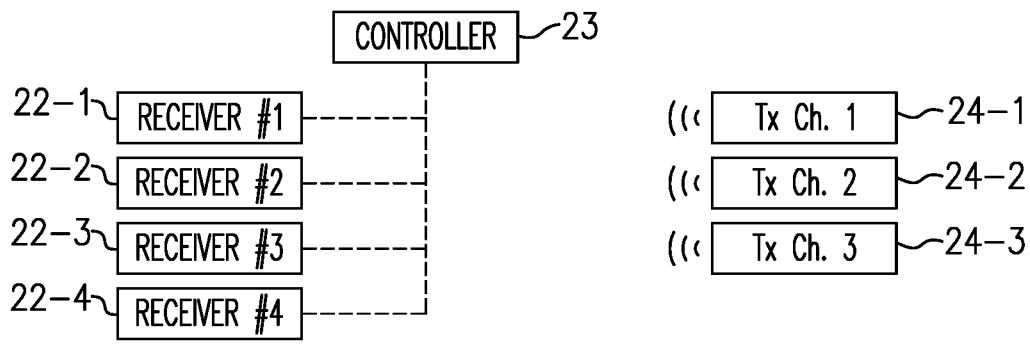
FIG. 1 illustrates an example radio frequency system.

The present disclosure relates to wireless communication, and more particularly to improving system latency.

An increasing number of electronic devices are able to communicate wirelessly with other electronic devices. The ability to wirelessly communicate eliminates the need to have electronic devices hard wired to each other. However, because the electronic devices are not hard wired to each other, there is a possibility of interference with the wireless signal that could reduce the ability to communicate.

In one exemplary embodiment, a method of operating a communicator includes operating a first receiver of a plurality of receivers on a first channel of a series of channels. A second receiver of the plurality of receivers is operated on a second channel of the series of channels. A third receiver of the plurality of receivers is operated on a third channel of the series of channels. The second receiver that operates on the second channel includes preferably a 50% reception overlap period with the first receiver that operates on the first channel and preferably a 50% reception overlap period with the third receiver that operates on the third channel.

In a further embodiment of any of the above, a reception time period of the third receiver that operates on the third channel is spaced from a reception time period of the first receiver.

In a further embodiment of any of the above, the plurality of receivers is equal to or greater in number than the number of channels in the series of channels.

In a further embodiment of any of the above, the series of channels form a consecutive loop.

In a further embodiment of any of the above, the first receiver, the second receiver, and the third receiver include an equal dwell time for reception for each of the channels in the series of channels.

In a further embodiment of any of the above, the first receiver, the second receiver, and the third receiver operate on preferably a 50% duty cycle.

In a further embodiment of any of the above, preferably the 50% duty cycle includes an equal split time between an active reception period of one of the series of channels and a non-active reception period.

In a further embodiment of any of the above, the plurality of receivers includes a fourth receiver.

In a further embodiment of any of the above, the fourth receiver that operates on the second channel includes preferably a 50% reception overlap period with the third receiver that operates on the first channel.

In a further embodiment of any of the above, preferably the 50% reception overlap period between the fourth receiver and the third receiver includes preferably a second 50% of a reception period of the third receiver and preferably a first 50% of the reception period of the fourth receiver.

In a further embodiment of any of the above, the fourth receiver that operates on the second channel includes preferably a 50% reception overlap period with the first receiver that operates on the third channel.

In a further embodiment of any of the above, preferably the 50% reception overlap period between the fourth receiver and the first receiver includes preferably a second 50% of a reception period of the fourth receiver and preferably a first 50% of the reception period of the first receiver.

In a further embodiment of any of the above, the first receiver, the second receiver, the third receiver, and the fourth receiver include an equal dwell time for each of the channels in the series of channels.

In a further embodiment of any of the above, the first receiver, the second receiver, the third receiver, and the fourth receiver operate on preferably a 50% duty cycle with an equal split time between an active reception period of one of the series of channels and a non-active reception period.

In a further embodiment of any of the above, preferably the 50% reception overlap period between the first receiver and the second receiver includes preferably a second 50% of a reception period of the first receiver and preferably a first 50% of the reception period of the second receiver.

In a further embodiment of any of the above, preferably the 50% reception overlap period between the second receiver and the third receiver includes preferably a second 50% of the reception period of the second receiver and preferably a first 50% of the reception period of the third receiver.

In another exemplary embodiment, a radio frequency system includes a first receiver, a second receiver, and a third receiver. A controller is configured to operate a first receiver of a plurality of receivers on a first channel of a series of channels. A second receiver of the plurality of receivers is operated on a second channel of the series of channels. A third receiver of the plurality of receivers is operated on a third channel of the series of channels. The second receiver operated on the second channel includes preferably a 50% receiver overlap period with the first receiver that operates on the first channel and preferably a 50% receiver overlap period with the third receiver that operates on the third channel.

In a further embodiment of any of the above, a fourth receiver is operated with the controller.

In a further embodiment of any of the above, the fourth receiver that operates on the second channel includes preferably a 50% receiver overlap period with both the third receiver that operates on the first channel and the first receiver that operates on the third channel.

In a further embodiment of any of the above, a plurality of transmitters transmits on at least one of the first channel, the second channel, or the third channel.

FIG. 1 illustrates an example radio frequency system 20 including a plurality of receivers 22 in communication with a plurality of transmitters 24. In the illustrated example, the radio frequency system 20 includes a first receiver 22-1, a second receiver 22-2, a third receiver 22-3, and a fourth receiver 22-4 that communicate with a first transmitters 24-1, a second transmitter 24-2, a third transmitter 24-3. The first, second, third, and fourth receivers 22-1, 22-2, 22-3, and 22-4 are controlled by a controller 23 having a microprocessor and memory to perform the operations outlined below.

Figure 2:
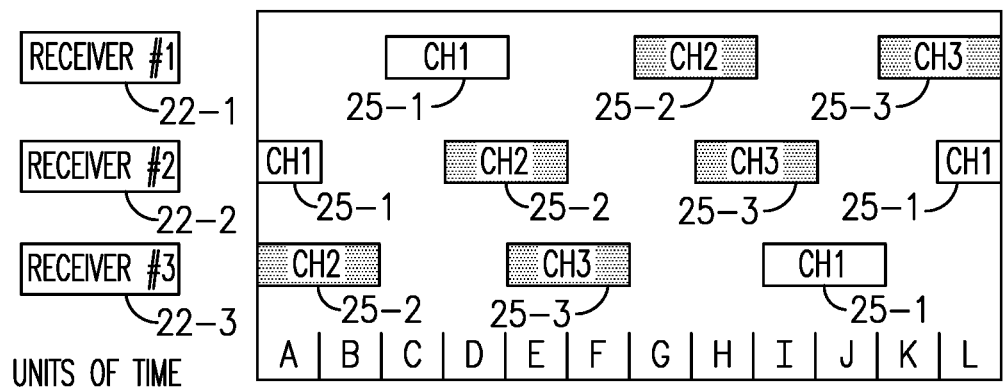
FIG. 2 schematically illustrates an operating sequence for three receivers.
Figure 3:
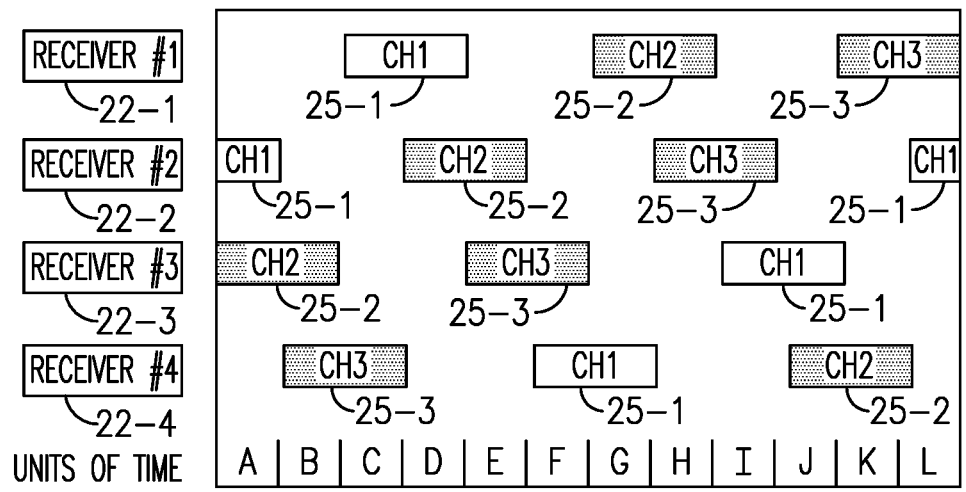
FIG. 3 schematically illustrates an operating sequence for four receivers.

FIGS. 2 and 3 schematically illustrate operating sequences for a system with three receivers 22-1, 22-2, and 22-3 and a system with four receivers 22-1, 22-2, 22-3, and 22-4, respectively. In the illustrated example, the first, second, third, and fourth receivers 22-1, 22-2, 22-3, 22-4 each include equal dwell time on preferably a 50% duty cycle through a series of a first, second, and third channel 25-1, 25-2, and 25-3. Preferably the 50% duty cycle for each of the first, second, third, and fourth receivers 22-1, 22-2, 22-3, and 22-4 includes a repetitive cycle with an equal split in time between an active reception period of the channels 25 and a non-active reception period. Additionally, for both the systems the number of receivers 22 is equal to or greater than the number of channels 25 respectively. The channels 25-1, 25-2, and/or 25-3 in each of the respective systems are monitored in a consecutive loop for each of the receivers 22-1, 22-2, 22-3, and/or 22-4 in a staggered pattern as described further below.

While equal dwell times may be preferred, in other embodiments some or all of the dwell times may be unequal. Similarly, the duty cycles may be other than the preferable 50%.

As shown in FIGS. 2 and 3, each of the receivers 22-1, 22-2, 22-3, and/or 22-4 actively receive a channel for two consecutive units of time and are non-active for two consecutive units of time. In the illustrated example, the units of time are labeled A-L in FIGS. 2 and 3. The units of time are only intended to illustrate the relative periods between a receiver 22 actively receiving one of the channels 25 and the receiver 22 being non-active. The specific units or number of units for operating any of the receivers 22-1, 22-2, 22-3, or 22-4 can vary depending on application. One feature of having a non-active period for each of the receivers 22-1, 22-2, 22-3, and 22-4 is an overall reduction in energy consumption for the system 20.

FIG. 2 illustrates the example system with the first, second, and third receiver 22-1, 22-2, and 22-3 capable of receiving the first, second, or third channel 25-2, 25-2, or 25-3. In the illustrated example, when the first receiver 22-1 operates on the first channel 25-1 for units of time C-D, the second receiver 22-2 operates on the second channel 25-2 for units of time D-E, and the third receiver 22-3 operates on the third channel 25-3 for units of time E-F.

Therefore, in this example, the second receiver 22-2 includes preferably a 50% overlap in reception time period with the first receiver 22-1 is receiving one of channels 25 and the third receiver 22-3 is receiving another one of the channels 25. However, when the third receiver 22-3 is operating on any of the channels 25-1, 25-2, or 25-3, the third receiver only includes preferably a 50% overlap reception time period with the second receiver 22-1. Therefore, the first receiver 22-1 and the third receiver 22-2 do not overlap in reception time. Additionally, preferably a first 50% of reception time of the second receiver 22-2 overlaps with a second 50% of reception time of the first receiver 22-1 and a second 50% of reception time of the second receiver 22-2 overlaps with a first 50% of reception time of the third receiver 22-3.

In other embodiments the overlaps may be different from preferably 50%. For example, overlaps of about 50% or between about 37.5% and about 62.5% may be desirable depending on the circumstances. Similarly, overlaps between about 25% and about 75% may offer some benefits. In addition, in some embodiments the overlaps need not be the same between the channels or from period to period.

Additionally, while the above identified example in FIG. 2 identifies specific receivers 22 and channels 25, other channels 25 could be used in place of the ones identified in the illustrated example. Specifically, as shown in FIG. 2, each of the receivers 22-1, 22-2, and 22-3 cycle through a consecutive loop of the channels 25-1, 25-2, and 25-3 such that the specific channel 25 that the receiver 22 is operating on may vary, but the overlap in reception time period between the receivers 22-1, 22-2, and 22-3 will remain the same.

One feature of this configuration is the ability to reduce system latency. If one of the channels 25-1, 25-2, or 25-3 was blocked during operation of the system 20A, the longest period of time without one of the receivers 22-1, 22-2, or 22-3 receiving a signal from any one of the channels 25-1, 25-2, or 25-3 would be one unit of time. For example, if the first channel 25-1 was blocked, none of the receivers 22-1, 22-2, or 22-3 would be able to receive a signal for time periods C and J. However, if there was no overlap in reception time between some of the channels 25-1, 25-2, or 25-3, then the time period without reception would include two consecutive units of time or double the system latency achieved with this disclosure.

Similarly, if two of the channels 25-1, 25-2, or 25-3 were blocked, the longest time period that one of the receivers 22-1, 22-2, or 22-3 would be without reception of one of the channels 25-1, 25-2, or 25-3 would be four units of time. However, if there was not any overlap in reception time between the receivers 22-1, 22-2, or 22-3 as described above, then the time period without reception time would include six consecutive units of time.

FIG. 3 schematically illustrates operation of the system with the first, second, third, and fourth receivers 22-1, 22-2, 22-3, and 22-4 operating on the first, second, and third channels 25-1, 25-2, and 25-3. The system is similar to the system with three receivers except where described below or shown in the Figures. In the illustrated example, when the first receiver 22-1 operates on the first channel 25-1 for units of time C-D, the second receiver 22-2 operates on the second channel 25-2 for units of time D-E, the third receiver 22-3 operates on the third channel 25-3 for units of time E-F, and the fourth receiver 22-4 operates on the first channel 25-1 for units of time F-G.

Therefore, in this example, the second receiver 22-2 includes preferably a 50% overlap in reception time with the first receiver 22-1 operating on the first channel 25-1 and the third receiver 22-3 operating on the third channel 25-3. Additionally, the fourth receiver 22-4 includes preferably a 50% overlap in reception time with the third receiver 22-3 operating on the third channel 25-3 and the first receiver 22-1 operating on the second channel 25-2. In particular, preferably a first 50% of reception time of the fourth receiver 22-4 overlaps with a second 50% of reception time of the third receiver 22-3 and a second 50% of reception time of the fourth receiver 22-4 overlaps with a first 50% of reception time of the first receiver 22-1.

In some embodiments the overlaps may be different from preferably 50%. In a non-limiting example, overlaps about 50% or between about 37.5% and about 62.5% may be desirable depending on the circumstances. Similarly, in a non-limiting example overlaps between about 25% and about 75% may offer some benefits. In addition, in some embodiments the overlaps need not be the same between the channels or from period to period.

Additionally, while the above identified example in FIG. 3 identifies specific receivers 22 and channels 25, other channels 25 could be used in place of the ones identified. Specifically, as shown in FIG. 3, each of the receivers 22-1, 22-1, 22-3, and 22-4 cycle through a consecutive loop of the channels 25-1, 25-2, and 25-3 such that the specific channel 25 that the receiver 22 is operating on may vary, but the overlap in reception time periods between the receivers 22-1, 22-2, 22-3, and 22-4 will remain the same. Nonetheless, in other embodiments the overlap in reception time periods between the receivers may differ.

Unlike an exemplary system with three receivers, each of the receivers 22-1, 22-2, 22-3, and 22-4 include preferably a 50% overlap time in reception with two other receivers 22. Therefore, if a single one of the channels 25-1, 25-2, or 25-3 is blocked, at least one of the receivers 22-1, 22-2, 22-3, and 22-4 will have reception with one of the channels 25-2, 25-2, or 25-3. Furthermore, if two of the channels 25-1, 25-2, or 25-3 are blocked, the longest time period that one of the receivers 22-1, 22-2, 22-3, or 22-4 would be without reception would be one unit of time.

Figure 4:
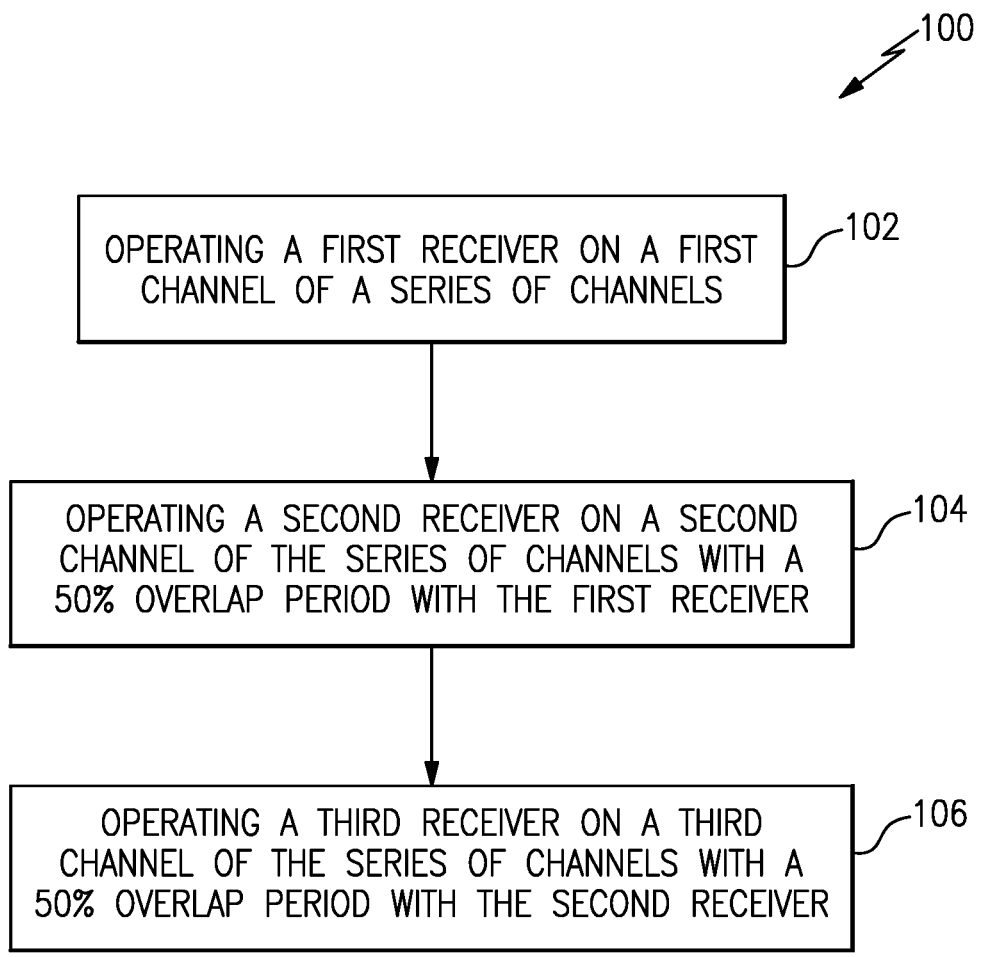
FIG. 4 illustrates a method of operating the example radio frequency system of FIG. 1.

FIG. 4 illustrates a method 100 of operating the systems 20A and 20B. The method 100 includes operating the first receiver 22-1 on the first channel 25-1 of the series of channels 25. Item 102. Then operating the second receiver 22-2 on the second channel 25-2 of the series of channels 25 with preferably a 50% overlap reception time period with the first receiver 22-1 operating on the first channel 25-1. Item 104. Then operating the third receiver 22-3 on the third channel 25-3 of the series of channels 25 with preferably a 50% overlap reception time period with the second receiver 22-2 operating on the second channel 25-2. Item 106. Although the method 100 only illustrates operation with respect to three receivers 22-1, 22-2, and 22-3 and three channels 25-1, 25-2, and 25-3, additional receivers 22 and channels 25 can be used following this pattern of having preferably a 50% overlap period of reception of the newest receiver 22 with a receiver 22 activated immediately prior.

In other embodiments the overlaps may be different from preferably 50%. In a non-limiting example, overlaps of about 50%, or between about 37.5% and about 62.5%, or between 37.5% and 62.5%, may be desirable depending on the circumstances or performance requirements. Similarly, in a non-limiting example overlaps between about 25% and about 75%, or between 25% and 75%, may offer some benefits.

In addition, in some embodiments the overlaps need not be the same between the channels or from period to period.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of operating a communicator, the method comprising:
    operating a first receiver of a plurality of receivers on a first channel of a series of channels;
    operating a second receiver of the plurality of receivers on a second channel of the series of channels; and
    operating a third receiver of the plurality of receivers on a third channel of the series of channels;
    wherein operating the second receiver on the second channel includes a reception overlap period of about 25% to about 75% with the first receiver operating on the first channel and a reception overlap period of about 25% to about 75% with the third receiver operating on the third channel;
    wherein the first receiver, the second receiver, and the third receiver operate on a 50% duty cycle; and
    wherein the 50% duty cycle includes an equal split time between an active reception period of one of the series of channels and a non-active reception period.

2. The method of claim 1, wherein a reception time period of the third receiver operating on the third channel is spaced from a reception time period of the first receiver.

3. The method of claim 1, wherein the plurality of receivers is equal to or greater in number than the number of channels in the series of channels.

4. The method of claim 3, wherein the series of channels form a consecutive loop.

5. The method of claim 1, wherein the first receiver, the second receiver, and the third receiver include an equal dwell time for reception of each of the channels in the series of channels.

6. The method of claim 1, wherein the plurality of receivers includes a fourth receiver.

7. The method of claim 6, wherein the fourth receiver operating on the second channel includes a reception overlap period of about 25% to about 75% with the third receiver operating on the first channel.

8. The method of claim 7, wherein the reception overlap period of about 25% to about 75% between the fourth receiver and the third receiver includes a second about 25% to about 75% of a reception period of the third receiver and a first about 25% to about 75% of the reception period of the fourth receiver.

9. The method of claim 6, wherein the fourth receiver operating on the second channel includes a reception overlap period of about 25% to about 75% with the first receiver operating on the third channel.

10. The method of claim 9, wherein the of about 25% to about 75% reception overlap period between the fourth receiver and the first receiver includes a second about 25% to about 75% of a reception period of the fourth receiver and a first of about 25% to about 75% of the reception period of the first receiver.

11. The method of claim 6, wherein the first receiver, the second receiver, the third receiver, and the fourth receiver include an equal dwell time for each of the channels in the series of channels.

12. The method of claim 11, wherein the first receiver, the second receiver, the third receiver, and the fourth receiver operate on a 50% duty cycle with an equal split time between an active reception period of one of the series of channels and a non-active reception period.

13. The method of claim 1, wherein the about 25% to about 75% reception overlap period between the first receiver and the second receiver includes a second about 25% to about 75% of a reception period of the first receiver and a first of about 25% to about 75% of the reception period of the second receiver.

14. The method of claim 13, wherein the about 25% to about 75% reception overlap period between the second receiver and the third receiver includes a second about 25% to about 75% of the reception period of the second receiver and a first of about 25% to about 75% of the reception period of the third receiver.

15. A radio frequency system comprising:
a first receiver, a second receiver, and a third receiver; and
a controller configured to perform the following operations:
operating a first receiver of a plurality of receivers on a first channel of a series of channels;
operating a second receiver of the plurality of receivers on a second channel of the series of channels; and
operating a third receiver of the plurality of receivers on a third channel of the series of channels;
wherein operating the second receiver on the second channel includes a receiver overlap period of about 25% to about 75% with the first receiver operating on the first channel and a receiver overlap period of about 25% to about 75% with the third receiver operating on the third channel;
wherein the first receiver, the second receiver, and the third receiver operate on a 50% duty cycle; and
wherein the 50% duty cycle includes an equal split time between an active reception period of one of the series of channels and a non-active reception period.

16. The system of claim 15, including a fourth receiver and operating the fourth receiver with the controller.

17. The system of claim 16, wherein the fourth receiver operating on the second channel includes a receiver overlap period of about 25% to about 75% with both the third receiver operating on the first channel and the first receiver operating on the third channel.

18. The system of claim 16, including a plurality of transmitters transmitting on at least one of the first channel, the second channel, or the third channel.

* * * * *